United States Patent [19]

Baals et al.

[11] Patent Number: 5,396,547
[45] Date of Patent: Mar. 7, 1995

[54] ARRANGEMENT FOR ENTERING INFORMATION INTO A DIRECTORY ON A TELEPHONE TERMINAL

[75] Inventors: Kimberly A. Baals, Matawan; Kathleen J. Chylinski, Bridgewater; Darren A. Kall, Highland Park; Gary C. Smith, Freehold, all of N.J.

[73] Assignee: AT&T Corp., Murray Hill, N.J.

[21] Appl. No.: 47,588

[22] Filed: Apr. 13, 1993

[51] Int. Cl.⁶ .................... H04M 11/00; H04M 1/00
[52] U.S. Cl. ................................ 379/96; 379/354; 379/355; 379/356
[58] Field of Search ............ 379/354, 355, 356, 357, 379/93, 96, 97, 98, 142

[56] References Cited

U.S. PATENT DOCUMENTS

| | | | |
|---|---|---|---|
| 4,425,627 | 1/1984 | Eibner | 379/355 |
| 4,588,863 | 5/1986 | Ross | 379/377 |
| 4,709,387 | 11/1987 | Masuda | 379/355 |
| 4,924,496 | 5/1990 | Figa et al. | 379/142 |
| 5,136,637 | 8/1992 | Rust et al. | 379/216 |

Primary Examiner—Curtis Kuntz
Assistant Examiner—Jason Chan
Attorney, Agent, or Firm—Samuel R. Williamson

[57] ABSTRACT

A softkey directory for use in a telephone terminal is arranged such that a user of the terminal is prevented from entering the same name identifier at more than one softkey label. The directory is further arranged such that the user of the telephone terminal also is prevented from entering a telephone number without an associated name identifier and from entering a name identifier without an associated telephone number.

20 Claims, 4 Drawing Sheets

ARRANGEMENT FOR ENTERING INFORMATION INTO A DIRECTORY ON A TELEPHONE TERMINAL

BACKGROUND OF THE INVENTION

1. Technical Field

This invention is directed to telephone terminals and more particularly, to configurable telephone terminals.

2. Description of the Prior Art

Current trends in the design of telephone terminals indicate that more and more telephone functionality is being integrated into the telephone display. For example, information as to the features available on the display has migrated from LEDs to the display, and local additions such as telephone number directories, status inspection, incoming caller information etc., are all migrating to the display.

Many interactive display arrangements available today permit accessing the features available on the display through softkeys. One such feature available on these arrangements is a personalized directory of frequently called telephone numbers for the user. A user may enter these numbers and provide associated names which appear as softkey labels for identifying these numbers. These directory entries are accessed by the user and while being viewed may be dialed automatically in these display arrangements.

The prior art interactive display arrangements with a personalized directory allow a user to enter duplicate names into the directory. Duplicate names, however, can confuse the user and misdialing errors can easily occur. By way of example, if a user is allowed to provide in the directory two softkey labels having the same name, the user unfortunately is forced to remember which of the two softkey labels will place a call to the person he or she is then trying to reach.

These prior art interactive display arrangements also allow a user to enter a telephone number without a name or the name without the telephone number into the directory. Having a directory entry with a name but no telephone number can also lead to misdialing errors. Also having a directory entry with a telephone number but no name creates an undefined or blank softkey label in the directory at which the user can place a call. When attempting to use the directory, finding such an entry without an associated softkey label is very difficult for a user.

SUMMARY OF THE INVENTION

The prior art problems are solved in accordance with the present invention by providing a personalized softkey directory arranged such that a user of a telephone terminal containing this directory is prevented from entering the same name identifier at more than one softkey label. The directory is further arranged such that the user of the terminal is also prevented from entering a telephone number without an associated name identifier and from entering a name identifier without an associated telephone number.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
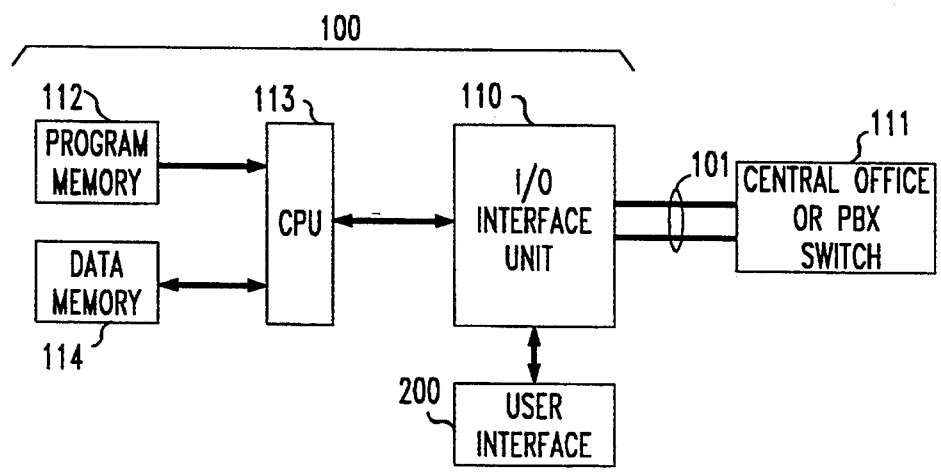
FIG. 1 is a block diagram of a telephone terminal usable for incorporating the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
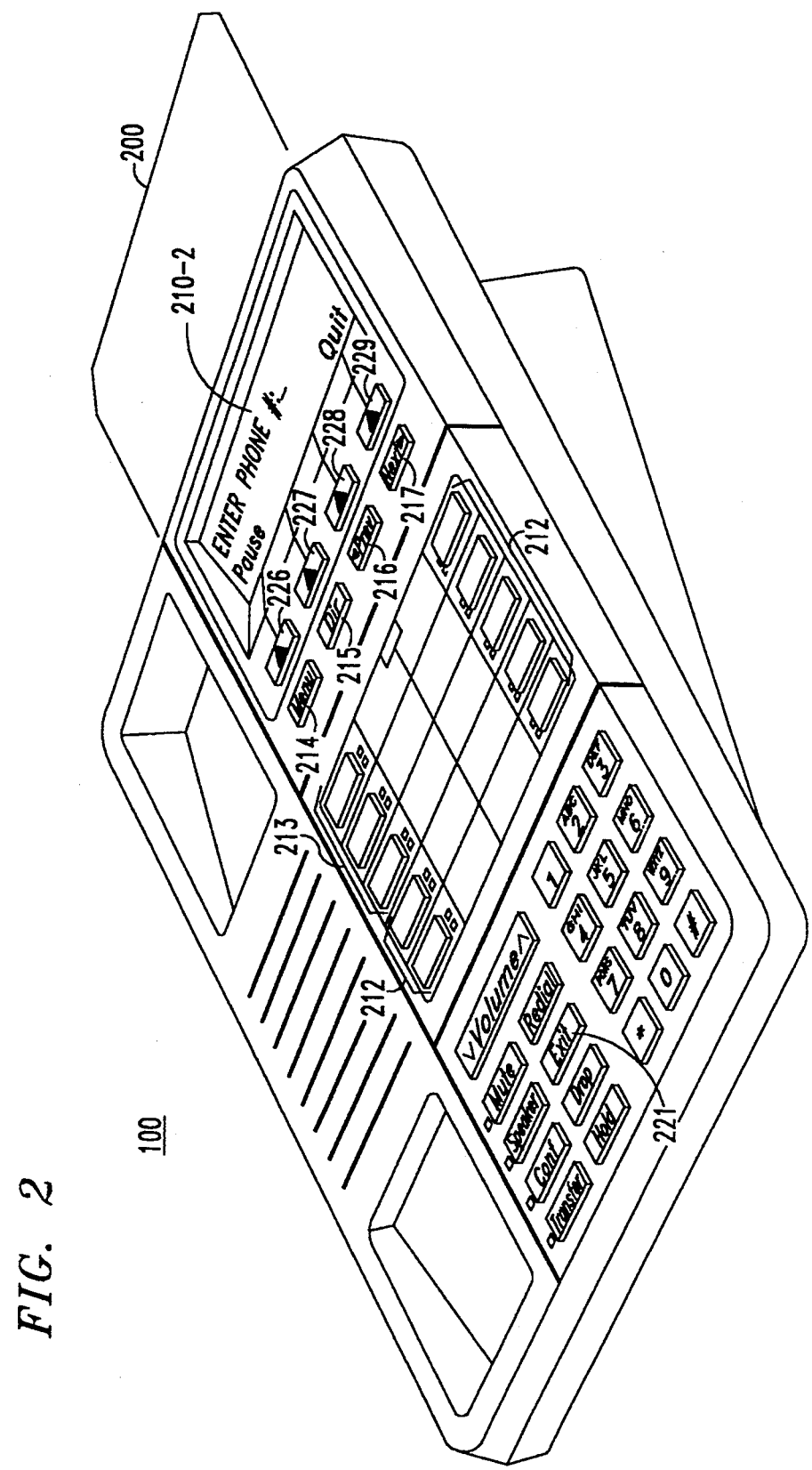
FIG. 2 illustrates the telephone terminal of FIG. 1 including a user interactive display displaying a first menu screen, accessible in accordance with the present invention.
Figure 4:
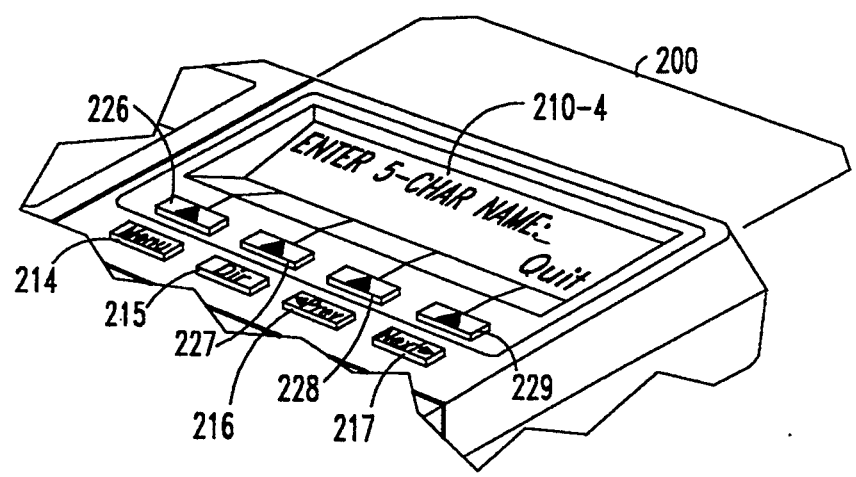
FIG. 4 illustrates the telephone terminal of FIG. 1 including the user interactive display displaying a third menu screen, accessible in accordance with the present invention.
Figure 5:
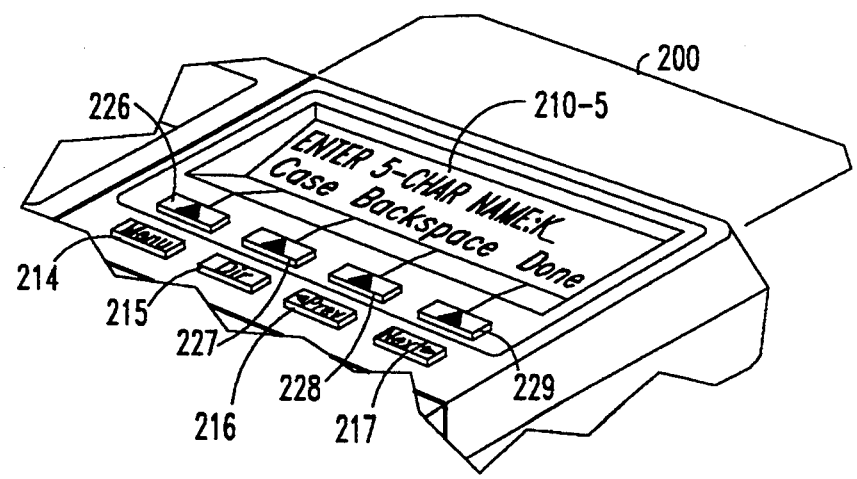
FIG. 5 illustrates the telephone terminal of FIG. 1 including the user interactive display displaying a fourth menu screen, accessible in accordance with the present invention.
Figure 6:
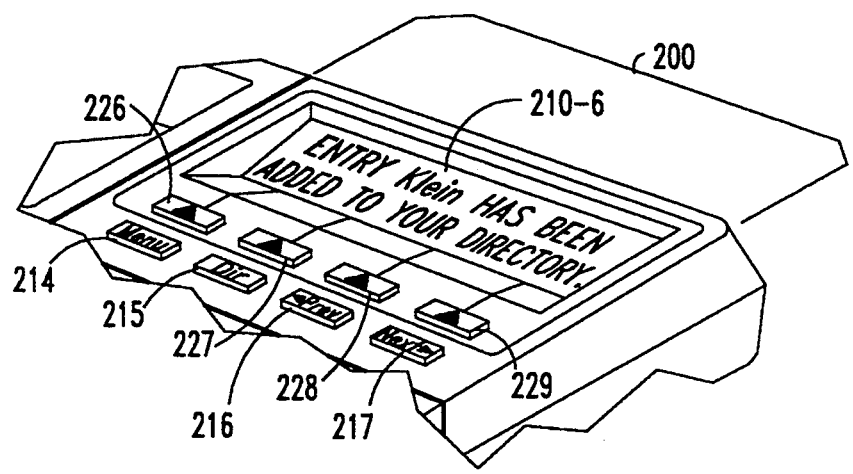
FIG. 6 illustrates the telephone terminal of FIG. 1 including the user interactive display displaying a fifth menu screen, accessible in accordance with the present invention.
Figure 7:
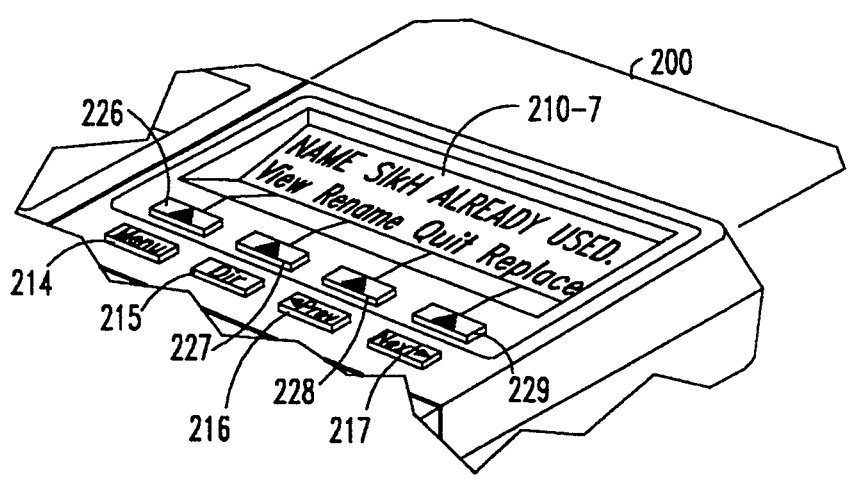
FIG. 7 illustrates the telephone terminal of FIG. 1 including the user interactive display displaying a sixth menu screen, accessible in accordance with the present invention.

With general reference now to FIG. 2, the user interface 200 comprises a user interactive display shown as menu screen 210-2, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state, one aspect of which is described in greater detail later herein with specific reference to the menu screens 210-2 through 210-7 shown in FIG. 2 through 7. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, name identifiers and telephone numbers may be accessed by these buttons for entering or editing with the softkeys 226 through 229. Also the <Prev and Next> buttons 216 and 217 may be used in the switch feature state, for example, to display the previous or next entry in a directory query feature. The labels and functions of the softkeys 226 through 229 appear on the associated menu screen 210-2. The label or function for each of these keys changes dynamically as the user performs functions and makes selections via these softkeys.

While the embodiment of the present invention is described as being incorporated into a telephone terminal, it should be recognized that the present command-operated terminal could be utilized in a computer or other program-controlled system. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2 together with the menu screens 210-2, 210-3, 210-4, 210-5, 210-6 and 210-7 of FIGS. 2, 3, 4, 5, 6 and 7, respectively, which taken together describe the logical steps and the various parameters required to implement the present invention.

A softkey directory is provided, in accordance with the invention, for preventing a user of a telephone terminal containing this directory from entering the same character string or name identifier in more than one directory entry. The directory is further arranged such that the user of the terminal is also prevented from entering a telephone number without an associated name identifier and from entering a name identifier without an associated telephone number.

In an illustration of the functionality of the softkey directory, the following operative description, in accordance with the invention, is provided. In this regard and with reference first to the initial number entry menu screen 210-2 shown in FIG. 2, when a user wishes to enter a telephone number, he or she accesses this screen in the menu hierarchy. Shown in this menu screen 210-2 is a field for entering a telephone number.

Figure 3:
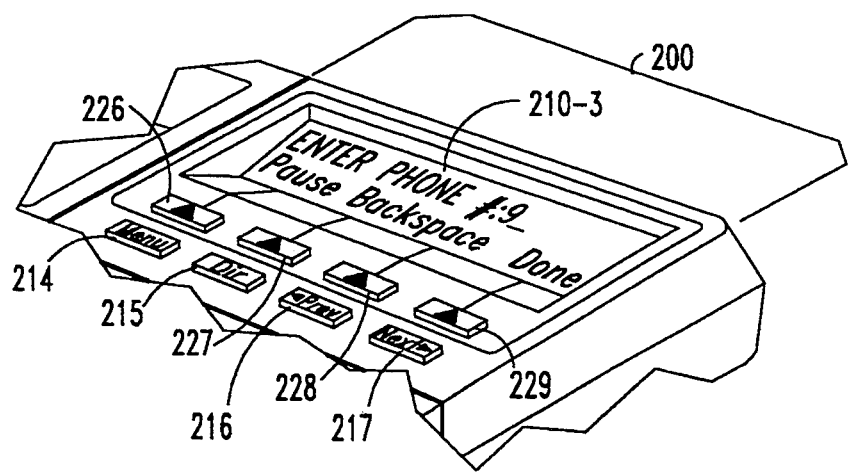
FIG. 3 illustrates the telephone terminal of FIG. 1 including the user interactive display displaying a second menu screen, accessible in accordance with the present invention.

A user is not permitted to advance from this screen 210-2 to an editing number entry screen 210-3, shown in FIG. 3, until a digit, or other recognizable symbol such as the pause symbol represented by the pause softkey label, is entered. The user is otherwise presented only with the Quit softkey 229 until a digit is entered. Pressing the Quit softkey 229 abandons the directory entry procedure. After a digit is entered, the label above the softkey 229 changes from Quit to Done for indicating at this time that the user is 1) at the editing number entry screen and 2) permitted, by pressing the Done softkey 229, to proceed to an initial character entry screen 210-4.

The initial character entry screen 210-4 operates in a manner similar to the initial number entry screen 210-2. This screen 210-4 presents only a Quit softkey label to the user until a character is entered into the screen. After a character has been entered, the softkey label changes from Quit to Done for indicating that the user is at the editing name entry screen 210-5. From this screen, the user is permitted to select the Done softkey 229 which saves both an original name identifier with a telephone number into the softkey directory.

After pressing the Done softkey 229 to save the name identifier and the telephone number, a process in the telephone terminal checks all existing directory entries to ensure that there is no exact duplicate entry for the name identifier portion of the entry attempting to be saved by the user of the telephone terminal. If a match is not found, the entry is saved as shown in menu screen 210-6. If a match is found, however, the user is informed as shown in menu screen 210-7. In this screen, the user is given the opportunity to: 1) rename the new entry; 2) replace the old entry with the new entry; 3) view the old and new phone numbers; or 4) quit and not save the new entry. Another way of eliminating a duplicate entry also includes giving the user the option of renaming the old entry.

What has been described is merely illustrative of the present invention. Other applications to telephone, computer or other user interactive systems other than the disclosed system are contemplated as being within the knowledge of one skilled in the an and may be utilized without departing from the spirit and scope of the present invention.

We claim:

1. An arrangement for displaying menu screens of information messages in a display device at a telephone terminal, the arrangement comprising:
   means for generating a plurality of sets of information messages in the telephone terminal, each one of the sets of information messages being indicative of a directory entry and including a character string and telephone number for displaying in an associated menu screen;
   means for generating for display both an initial character entry screen and an editing name entry screen for entering said character string in each one of the plurality of sets of information messages for identifying a specific directory entry;
   means for advancing from the initial character entry screen to the editing name entry screen; and
   means for preventing said advancing means from advancing to the editing name entry screen from the initial character entry screen until a character is entered into said character entry screen by a user at the telephone terminal.

2. The arrangement of claim 1 wherein said character is entered into the initial character entry screen and subsequent characters are entered into the editing name entry screen.

3. The arrangement of claim 1 wherein the user is able to exit the initial character entry screen without entering said character by actuating a quit softkey.

4. The arrangement of claim 3 wherein the preventing means, responsive to the character entry screen and name entry screen generating means, examines each of existing character strings assigned to the plurality of sets of information messages upon detecting the entry of a specific character string.

5. The arrangement of claim 2 wherein the preventing means, upon detecting an existing identical character string in one of the plurality of sets of information messages, prevents the entering of said specific character string.

6. The arrangement of claim 5 further comprising means for preventing the entry of a character string to a directory without a telephone number accompanying said character string.

7. The arrangement of claim 5 further comprising means for preventing the entry of a telephone number to a directory without a character string accompanying said telephone number.

8. The arrangement of claim 6 wherein said character string comprises a name identifier for associating with and identifying said telephone number in the directory entry.

9. A method for displaying menu screens of information messages in a display device at a telephone terminal, the method comprising the steps of:
generating a plurality of sets of information messages in the telephone terminal, each one of the sets of information messages being indicative of a directory entry and including a character string and telephone number for displaying in an associated menu screen;
generating for display both an initial character entry screen and an editing name entry screen for entering said character string in each one of the plurality of sets of information messages for identifying a specific directory entry;
advancing from the initial character entry screen to the editing name entry screen; and
preventing said advancing step from advancing to the editing name entry screen from the initial character entry screen until a character is entered into said character entry screen by a use at the telephone terminal.

10. The method of claim 9 wherein the preventing step further comprises the step of examining each of existing character strings assigned to the plurality of sets of information messages upon detecting the entry of a specific character string.

11. The method of claim 9 wherein the preventing step, upon detecting an existing identical character string in one of the plurality of sets of information messages, prevents the entering of said specific character string.

12. The method of claim 11 further comprising the step of preventing the entry of a character string to a directory without a telephone number accompanying said character string.

13. The method of claim 12 further comprising the step of preventing the entry of a telephone number to a directory without a character string accompanying said telephone number.

14. The method of claim 13 wherein said character string comprises a name identifier for associating with and identifying said telephone number in the directory entry.

15. The method of claim 9 wherein said character is entered into the initial character entry screen and subsequent characters are entered into the editing name entry screen.

16. The method of claim 15 wherein the user is able to exit the initial character entry screen without entering said initial character by actuating a quit softkey.

17. An arrangement for displaying menu screens of information messages in a display device at a telephone terminal, the arrangement comprising:
means for generating a plurality of sets of information messages in the telephone terminal, each one of the sets of information messages being indicative of a directory entry and including a character string and telephone number for displaying in an associated menu screen;
means for generating for display both an initial character entry screen and an initial number entry screen for respectively entering an initial character of said character string and an initial symbol of said telephone number in each one of the plurality of sets of information messages for identifying a specific directory entry;
means for advancing from the initial character entry screen to an editing name entry screen for display, and for advancing from the initial number entry screen to an editing number entry screen for display; and
means for preventing the advancing means from advancing from the initial character entry screen to the editing name entry screen until said initial character is entered into said character entry screen by a user at the telephone terminal and from advancing from the initial number entry screen to the editing number entry screen until said initial symbol is entered into said initial number entry screen by said user at the telephone terminal.

18. The arrangement of claim 17 further comprising means for generating both an editing character entry screen and an editing number entry screen for respectively entering the remainder of said character string and the remainder of said telephone number for said specific directory entry.

19. The arrangement of claim 18 wherein the user is able to exit the initial character entry screen without entering said initial character by actuating a quit softkey.

20. The arrangement of claim 19 wherein the user is able to exit the initial number screen without entering said initial symbol by actuating a quit softkey.

* * * * *